(12) United States Patent
Jaiman et al.

(10) Patent No.: US 12,204,629 B2
(45) Date of Patent: Jan. 21, 2025

(54) APPARATUS, SYSTEM AND METHOD FOR SECURE DATA ENTRY

(71) Applicant: THALES DIS CPL USA, INC., Austin, TX (US)

(72) Inventors: Yateendra Jaiman, Pradesh (IN); Pranay Shahab Gupta, Pradesh (IN); Asad Mahboob Ali, Austin, TX (US)

(73) Assignee: THALES DIS CPL USA, INC., Austin, TX (US)

( * ) Notice: Subject to any disclaimer, the term of this patent is extended or adjusted under 35 U.S.C. 154(b) by 266 days.

(21) Appl. No.: 17/948,340

(22) Filed: Sep. 20, 2022

(65) Prior Publication Data

US 2024/0095331 A1    Mar. 21, 2024

(51) Int. Cl.
*G06F 21/36*    (2013.01)
(52) U.S. Cl.
CPC .................................. *G06F 21/36* (2013.01)
(58) Field of Classification Search
CPC ... H04W 12/082; H04W 12/06; H04W 12/61; H04W 12/63; H04W 12/71
See application file for complete search history.

(56) References Cited

U.S. PATENT DOCUMENTS

| | | |
|---|---|---|
| 6,246,769 B1 | 6/2001 | Kohut |
| 8,947,197 B2 | 2/2015 | Craymer et al. |
| 9,111,073 B1 | 8/2015 | Jiang et al. |
| 9,117,068 B1 | 8/2015 | Zhang et al. |
| 9,773,104 B1* | 9/2017 | Valecha ................... G06F 21/36 |
| 10,558,355 B2 | 2/2020 | Bean et al. |
| 11,119,648 B2 | 9/2021 | Bean et al. |
| 2011/0004928 A1 | 1/2011 | Won et al. |
| 2014/0053254 A1* | 2/2014 | Sun ......................... G06F 21/36 726/7 |
| 2017/0177851 A1 | 6/2017 | Sawant et al. |
| 2019/0012004 A1* | 1/2019 | Kim ....................... G06F 3/0481 |
| 2020/0387640 A1* | 12/2020 | Bikumala ............... G06F 21/84 |

OTHER PUBLICATIONS

International Search Report (PCT/ISA/2010) & Written Opinion (PCT/ISA/237) mailed by ISA/EP on Jan. 3, 2024 for corresponding International Application pursuant to the PCT, N°PCT/US2023/033193 (13 pages).

* cited by examiner

*Primary Examiner* — Nelson S. Giddins (57) ABSTRACT

A system or method of secure data entry can include one or more processors and memory having computer instructions which when executed by the one or more processors causes the one or more processors to perform the operations at a client edge device of executing a user interface data entry application on the client edge device, receiving data by the user interface data entry application, wherein the data entered is a graphic input pattern corresponding to characters, communicating the data entered to a server, and receiving access to the server if a data processing application at the server interprets the data entered as a credential based on rules negotiated between the data entry application and the data processing application and a template for the graphic input pattern.

12 Claims, 6 Drawing Sheets

| Entry index | Direction | Circle index | Segment index | Pause timer |
|---|---|---|---|---|
| 1 | | | | |
| 2 | | | | |
| 3 | | | | |
| ... | | | | |

700
FIG. 7

| Entry index | Direction | Circle index | Segment index | Pause timer |
|---|---|---|---|---|
| 1 | 0 | 1 | 4 | 6 |
| 2 | 0 | 1 | 1 | 2 |
| 3 | 1 | 1 | 20 | 2 |
| 4 | 0 | 2 | 16 | 2 |
| 5 | 1 | 2 | 13 | 1 |
| 6 | 1 | 2 | 14 | 1 |
| 7 | 0 | 2 | 16 | 3 |
| 8 | 0 | 2 | 12 | 4 |
| 9 | 1 | 1 | 9 | 5 |
| 10 | 0 | 2 | 5 | 2 |
| 11 | 0 | 3 | 2 | 3 |

800
FIG. 8

FIG. 9A  Flow of template pattern and rules setup

FIG. 9B  Flow of secure data entry for known pattern

FIG. 9C  Flow of secure data entry for known value selected graphically

APPARATUS, SYSTEM AND METHOD FOR SECURE DATA ENTRY

CROSS-REFERENCE TO RELATED APPLICATIONS

Not applicable.

TECHNICAL FIELD

The present disclosure generally relates to secure data entry. More particularly, but not exclusively, the present disclosure relates to secure data entry using an application or widget on a client device and in coordination with a data processing application at a server.

BACKGROUND

Digitalization of identities and information is increasing all over the world. Our personal information is stored in smartphones, laptops, cloud servers and other gadgets. It's an urgent need to protect this information from unauthorized access from other people, especially when this information is entered by the owner on an edge device. For example, shoulder surfing, and keystroke logging are common threats faced when entering sensitive and critical information. Thinking up appropriate passwords and then trying to remember them can be a constant effort for a computer user as well as troublesome.

Complex passwords, preferred by administrators and online services can be forgotten more easily by a user, or may be written down by a user in a discoverable location. Choosing a simple password makes it easier for the user to remember it, but then it may not be secure. Simple passwords can more easily be "hacked" by an unscrupulous person who then gains access to the user's account. Hackers will often use a "brute force" attack in order to crack a simple password. In certain situations, such as pins entered at an ATM or at a point of sale device, shoulder surfing can easily provide access to such "hacking" surfers.

Traditional authentication techniques only allow users to type in a password into a one-dimensional input box, which generates a sequential string according to what the user has input into the box. These traditional techniques are less secure and require the users to input longer and varied passwords in order to achieve greater security. One advanced technique disclosed in U.S. Pat. No. 9,111,073 by Trend Micro Inc. granted on Aug. 18, 2018 uses a two-dimensional grid into which a pattern or password is input. Even so, improvements upon the security and user friendliness provided by this technique would be desirable as the U.S. Pat. No. 9,111,073 patent proposes a method of password protection where two pieces of information are sent from a client to a server that includes both the password value itself and a pattern. The U.S. Pat. No. 9,111,073 patent requires a user to remember both the password and pattern and does not eliminate the password as part of the process. Further note that the pattern matrix used in the U.S. Pat. No. 9,111,073 patent is static which still can be subject to hacking by shoulder surfers and key-stroke loggers to extract information being entered by a user.

Therefore, while a user may wish to choose a simple password, often he or she is forced into choosing a complex one-dimensional password because of the requirements of the system administrator or of the online service. It would be desirable to provide further protection for passwords in general and for simple passwords as well, so that even simple passwords cannot be hacked.

Furthermore, with the prevalence of computer viruses and in particular 'Trojans' that capture keystrokes (including credit card and personal identification numbers ("PINs")) sending credit card information and PINs to an untrusted second party is inherently insecure.

In U.S. Pat. No. 6,246,769 there is disclosed a system for replacing PINS with a transaction specific code which the user identifies from a matrix of symbols by reference to a personal randomly chosen pattern and sequence of matrix positions which the user registers with a central database along with personal identification data/account data. When a transaction, for example, is to be made, the user's pattern is retrieved from the database, and the transaction specific code is created and then placed in a matrix in the pattern positions. The remaining spaces are filled with symbols not used in the transaction specific code, to hide the code, before the matrix is displayed to the user with a request to enter the symbols occupying the user's personal pattern positions. The terminal then establishes that the user has entered the correct hidden code before seeking authorization of the transaction.

In many situations, this process is undesirable for two principal reasons. Firstly, it requires the transmission of the user's stored personal pattern from the central database to the user terminal (ATM, for example), which is potentially insecure, and secondly the transaction requires either two separate data calls to the central database, or one continuous connection for the duration of the transaction. In either case, this is unacceptable for shop or bank transactions, as it would considerably increase the cost of operating the system—such transactions preferably only involve one brief communication to obtain authorization for the transaction—while possibly increasing the risk of a breach of transaction security if the authorization process required a continuous connection for the duration of the transaction.

In addition, the process disclosed in U.S. Pat. No. 6,246,679 cannot be used for off-line payment systems, since it requires access to the user's stored personal pattern.

U.S. Pat. No. 8,947,197 by SafeNet UK Ltd granted on Feb. 3, 2015 discloses another method for verifying a person's identity by storing a personal pattern of a predetermined number of locations on a grid in association with personal identification data, and subsequently using the pattern in a verification process. According to the invention, the subsequent verification process comprises the steps of: (a) presenting to the person a challenge grid of locations occupied by a pseudo-random set of symbols, and challenging the person to identify a response set of symbols occupying locations in the challenge grid corresponding to the stored personal pattern; (b) receiving from the person the response set; (c) generating from the challenge grid and the stored pattern a verification set of symbols occupying locations in the challenge grid corresponding to the stored personal pattern; (d) comparing the response set of symbols with the verification set of symbols; and (e) verifying the identity of the person if the response set is the same as the verification set.

U.S. Pat. No. 9,177,068B1 by Trend Micro, Inc. granted on Aug. 25, 2015 discloses another system where a user creates a pattern in a two-dimensional grid by entering a password and enters a user name. This user name, password and pattern are stored locally on a computing device or are transmitted to a remote computer server for later authentication. Upon authentication, a choice of input grids is displayed. The user chooses a grid, enters the password into the grid in the form of the pattern, and also enters the user name. The computer retrieves the previously stored pattern and password with the user name. A match with the stored password indicates authentication. Each cell of the input grid may contain more than one symbol of the password. The input grid may also be filled with random characters to improve security. A grid may be a rectangular matrix, a circular region, an asymmetrical region, or other.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

SUMMARY

In some embodiments, a system or method of secure data entry can include one or more processors and memory having computer instructions which when executed by the one or more processors causes the one or more processors to perform the operations at a client edge device of executing a user interface data entry application on the client edge device, receiving data by the user interface data entry application, where the data entered is a graphic input pattern corresponding to alphanumeric digits, communicating the data entered to a server, and receiving access to the server when a data processing application at the server interprets the data entered as a credential. Note that in accordance with some of the embodiments, either the graphic pattern or the underlying characters associated with the graphic pattern will vary in each instance to provide additional security (and obfuscation). In some embodiments, the passwords can be replaced by a pattern, such that the actual data transmitted is different each time making such systems less susceptible to shoulder surfers and key stroke loggers.

In some embodiments, the user interface data entry application receives a sequence of random or pseudo-random alphanumeric characters from the server for populating the graphic input pattern in a random or pseudo-random fashion and the client edge device transmits back to the server a portion of the sequence of the random or pseudo-random characters corresponding to a graphic template previously stored at the server when the graphic input pattern entered at the client edge device matches the credentials matching a set of alphanumeric characters stored corresponding to the graphic template at the server.

In some embodiments, the graphic input pattern is a circular pie containing a plurality of slices where each slice corresponds to a user selectable slice selectable by swiping by the slice, or clicking on the slice, or entering a sequence of characters on a keyboard corresponding to characters populated in the slices of the graphic input pattern.

In some embodiments, the graphic input pattern is a circular pie containing a plurality of slices, where each slice corresponds to a user selectable slice selectable by swiping by the slice or clicking on the slice or entering a sequence of characters on a keyboard corresponding to characters populated in the slices of the graphic input pattern for a predetermined number of consecutive slices in a clockwise or counterclockwise direction as defined by rules set apriori between the client edge device and server.

In some embodiments, the graphic input pattern having at least two layered circle patterns containing a plurality of segments, where each segment corresponds to a user selectable segment selectable by swiping by or clicking on segments on at least a first layer for a predetermined number of consecutive segments in a clockwise or counterclockwise direction and subsequently swiping by or clicking for another predetermined number of consecutive segments on a second layer in a direction opposite from the direction used for the first layer.

In some embodiments, the user interface data entry application includes settings for selecting a start position, an initial rotation direction for a first layer of a circular input pattern, and a number of consecutive segments to advance in the initial rotation direction for the first layer.

In some embodiments, the user interface data entry application further includes settings for selecting a number of segments to advance in an opposition direction from the initial rotation direction on a second layer of the circular input pattern.

In some embodiments, the user interface data entry application further includes settings for skipping shaded segments which can be done with shaded segments on either the first layer or the second layer or on both layers or on any number of layers in a multi-layered pattern.

In some embodiments, the user interface data entry application receives a sequence of alphanumeric digits from the server for populating the graphic input pattern in a known pattern (instead of random pattern) and the client edge device receives access to the server when it transmits back to the server a portion of the sequence of the alphanumeric digits corresponding to a graphic template previously stored at the server if the graphic input pattern entered at the client edge device matches the credential matching a set of alphanumeric numbers stored at the graphic template at the server based on rules negotiated and set between the client edge device and server.

In some embodiments, the user interface data entry application initially communicates the graphic input pattern as a template pattern to the server and the user interface data entry application subsequently receives from the server a plurality of alphanumeric digits for randomly occupying each of the segments of the graphic input pattern and where the client edge device in response to user input of correct credentials in graphic form sends a sequential listing of alphanumeric digits to the server corresponding to the template pattern with corresponding matching alphanumeric digits therein.

In some embodiments, the user interface data entry application generates a graphic user interface having a movable and selectable graphic pattern or patterns with a plurality of segments populated with alphanumeric characters selectable by manipulation of the selectable graphic pattern and pausing on a particular alphanumeric character for a predetermined threshold time frame for selection.

In some embodiments, the user interface data entry application includes settings for selecting an initial rotation direction and for selecting a pause timer value used for registering a character entry.

In some embodiments, the movable and selectable graphic patterns has at least two layered circle patterns containing a plurality of segments, where each segment corresponds to a user selectable segment having a corresponding alphanumeric character that is selectable by rotating one or more dials, each dial corresponding to each layer of the at least two layered circle patterns and where each dial can be independently rotated. In some embodiments, the user interface data entry application captures user interactions with the one or more dials and constructs a table including an entry index, direction, circle index, segment index and pause timer to decode a data entry for credentials according to predefined rules coordinated between the user interface data entry application on the client edge device and the data processing application at the server.

In some embodiments, system of secure data entry can include one or more processors and memory coupled to the one or more processors, where the memory includes computer instructions which when executed by the one or more processors causes the one or more processors to perform the operations at a data processing application at a server of executing the data processing application at the server, exchanging data between the data processing application and a user interface data entry application on a client edge device, receiving data from the client edge device from the user interface data entry application, wherein the data entered at the client edge device results from a graphic input pattern corresponding to alphanumeric characters stored at the server, and providing access to a restricted resource on the server when a data processing application at the server interprets the data entered as a credential.

In some embodiments, the server sends the user interface data entry application a sequence of random or pseudo-random alphanumeric digits for populating the graphic input pattern in a random or pseudo-random fashion and the server receives back from the client edge device a portion of the sequence of the random or pseudo-random digits corresponding the graphic input pattern entered at the client edge device and where access is granted to the restricted resource on the server if alphanumeric characters from the graphic input pattern entered at the client edge device matches alphanumeric characters at a graphic template previously stored at the server.

In some embodiments, the data processing application at the server initially receives from the user interface data entry application the graphic input pattern as a template pattern and the server subsequently sends to the user interface data entry application at the client edge device a plurality of alphanumeric digits for randomly occupying each of the segments of the graphic input pattern, and where the client edge device in response to user input of correct credentials in graphic form sends and the server receives a sequential listing of alphanumeric digits corresponding to the template pattern with corresponding matching alphanumeric digits therein.

In some embodiments, the user interface data entry application generates a graphic user interface having a movable and selectable graphic pattern or patterns with a plurality of segments populated by the server with alphanumeric characters selectable by manipulation of the selectable graphic pattern and pausing on a particular alphanumeric character for a predetermined threshold time frame for selection and the user interface data entry application further generates and sends data to populate an index table corresponding to the data entered using the graphic user interface where the server uses the data from the index table to decode the data selected by the user interface data entry application and received by the data processing application at the server.

In some embodiments, a method of secure data entry can include the steps of executing a user interface data entry application on the client edge device wherein the user interface data entry application generates a circular pattern having a plurality of selectable segments and where each selectable segment contains a corresponding character correlated in pattern or sequence between the user interface entry application at the client edge device and a data processing application at a server, receiving data by the user interface data entry application, and communicating to the server the data entered and processed at the user interface data entry application. The method can further include the step of receiving access to a restricted resource on the server if the data processing application at the server interprets the data entered at the client edge device as a credential corresponding to a previously stored credential.

In some embodiments, the circular pattern having the plurality of selectable segments actuates the selection of a sequence of corresponding characters by either selecting a graphic pattern formed from a sequence of adjacent selectable segments or by rotating one or more layers of segments to a selection position and pausing at the selection position for a predetermined threshold period before further rotating the one or more layers of segments.

BRIEF DESCRIPTION OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. Also in these instances, well-known structures may be omitted or shown and described in reduced detail to avoid unnecessarily obscuring descriptions of the embodiments.

The embodiments disclosed in certain embodiments provides a means of entering short sensitive information on a computing device in a secure way even when the device itself may be a vulnerable device, such as ATM, Server Key pads, personal computing devices, keyless doors, etc. The device would otherwise be considered insecure because it may have a keystroke logger, or the environment may be insecure because someone can steal sensitive information by shoulder surfing and seeing what the user is typing. The disclosed embodiments mitigate such risks associated with these threats and provide such protection with improved ease of use.

The above-mentioned problems can be solved by a combination of approaches and can be best explained with basic building blocks and components as further detailed below. In a number of embodiments, improvements over the art become apparent including the ability to use a single piece of information such as a pattern instead of both a password value itself and the pattern where just the pattern can be sent from a client device to a server. In some embodiments herein, the user can just remember the pattern rather than both a password and pattern. In some embodiments, there is no password to begin with or the password can be extracted by the system since a selected pattern can be based on pre-negotiated rules. In some embodiments, the pattern is dynamic and not static where the user is allowed to interact with a pattern or matrix such as by rotating a circular grid in one particular direction or another, pausing on segments, moving among layers or tiers, and performing other rules-based tasks that have significance in terms of decoding the user's dynamic data entry based on pre-negotiated rules. Only a server can generally extract the actual underlying data in such scenarios whereas the client cannot and certainly a casual observer such as a shoulder suffer cannot.

Component Diagram

Figure 1:
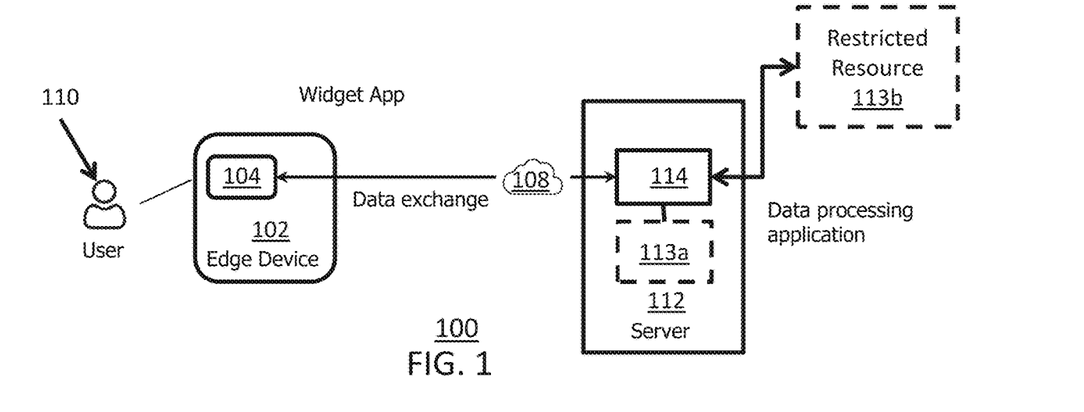
FIG. 1 illustrates a system of secure data entry in accordance with the embodiments.

The system 100 of FIG. 1 illustrates a simple and an exemplary embodiments that includes a client edge device 102 that is a computing device that user 110 uses to access online resources on a server 112 (or elsewhere), and to enter sensitive data. The client edge device 102 can be a computer, laptop, or mobile phone, for example. The client edge device 102 can include an application 104 such as a widget App that runs on the edge device. The user 110 can interact with this App 104 to enter sensitive information. Examples of the widget app can be an online application in a local web browser, a client application on the edge device, or an app on the mobile phone.

The system 100 can further include the server 112, which can be a server computer in the cloud, or a remote computer that processes the sensitive data submitted by the user using a data processing application 114.

The server 112 and the client edge device 102 can have a data exchange via connection through a network link 108. Data flows through this network link 108 using one or more protocols and usually a range of protocols. It is generally encrypted, but may not always be.

Data processing application 114 at the server 112 is an application that receives data sent by the widget app 104, and processes it. It will determine next steps in the data exchange. For example, if data entered is a login credential or an apparent attempt at same (password, one time password (OTP), etc.), the data processing application 114 will allow login or reject it. In case the data entered is not a credential but a critical part of an online transaction, (e.g. bank transfer), the data processing application 114 will pass that information to downstream applications (not shown).

A primary focus of the embodiments are the algorithms and workings of the widget app 104 and data processing application 114 and the corresponding data exchange and encoding and decoding that occurs in a data exchange pipeline or connection (108). The exchange can be done in many different ways, but three main approaches are further detailed herein including a first approach designated as "Known Pattern/Typed", a second designated as "Known Pattern, entered graphically", and a third designated as "Known value, entered graphically". There may be a number of variation on each of these themes.

Approach 1: Known Pattern, Typed

In this approach, the user 110 has selected a pattern and the user 110 then enters or types the corresponding matching characters by following a graphic pattern and rules known to both the client application 104 and data processing application 114 at the server. FIGS. 2A, 2B, 3A, 3B, 4A, and 4B illustrate such a scheme.

Figure 2A:
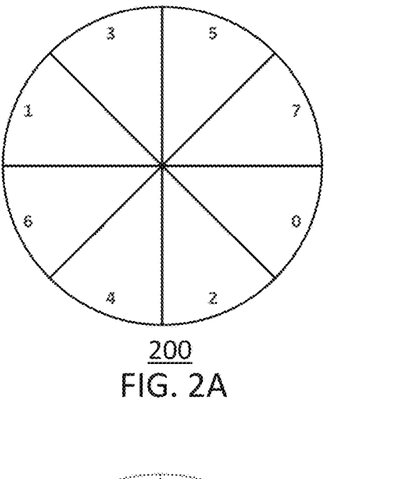
FIG. 2A illustrates a graphic user interface at a client edge device in accordance with the embodiments.

FIG. 2A demonstrates a user interface 200 as a simple single layer widget in the form of a circle or pie with multiple selectable slices. It is called single layer because there is only one circle and the pattern for entering data is simple as further illustrated by FIG. 2B where the user 110 would activate slices from point A to point B in a clockwise direction to enter the digits 7024. The entry of the data can take the form of a swipe in the noted pattern, or clicking on each segment in the noted pattern or alternatively the sequential entry on an associated keyboard with the underlying numbers shown in each of the slices.

Figure 3A:
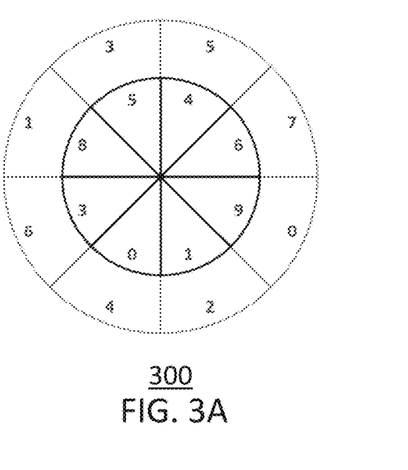
FIG. 3A illustrates a graphic user interface having a multi-layer or multi-tiered pattern at a client edge device in accordance with the embodiments.
Figure 3B:
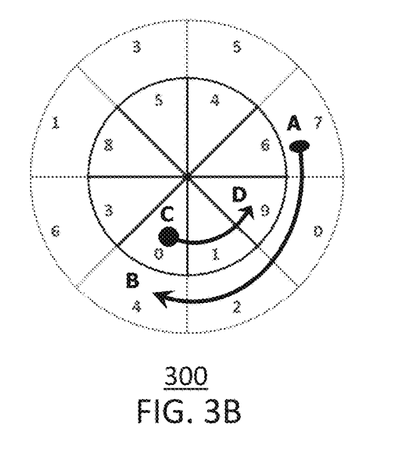
FIG. 3B represents a form of secure data entry (from point A to point B and then from point C to point D) using the graphic user interface of FIG. 3A.

FIG. 3A shows a more complex user interface 300 and corresponding widget having two layered or tiered circles. Here, the pattern is selected by the user 110 using, for example, the following steps:

In the example shown in FIG. 3B, the user selects a start position on the widget (point A) and further decides to first go clockwise or counter-clockwise (in the example shown, clockwise is chosen). Next, the user decides the number of spaces to advance (in this case, 4 space to point B) in the direction chosen in the prior step. The user 110 further decides the number of spaces (in this case 3 space from point C to point D) to advance in the opposite direction. The user can also set and decide if shaded segments are skipped (which is more apparent in the case of FIG. 4 and not shown as part of the example in FIG. 3). The system will assume the user 110 switches layers when going in opposite directions. For example, when on outer layer switch to inner layer, and vice versa. The sample pattern selection by user 110 is shown in FIG. 3B, that is 7024019

Figure 4A:
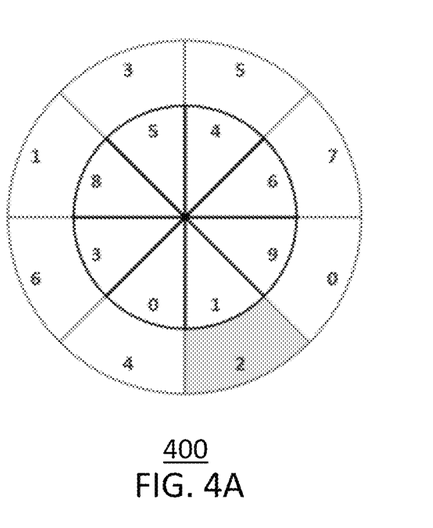
FIG. 4A illustrates a graphic user interface having a multi-layer or multi-tiered pattern further including shading on certain segments at a client edge device in accordance with the embodiments.
Figure 4B:
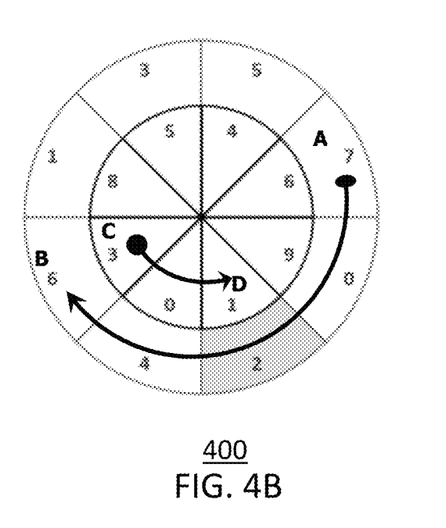
FIG. 4B represents a form of secure data entry (from point A to point B and then from point C to point D) using the graphic user interface of FIG. 4A.

The user interface 400 shown in FIGS. 4A and 4B present another example where shade segments are presented and skipped as part of the encoding and decoding. In the example of FIG. 4B, the following settings can exist:

(1) Select start position on widget=A
(2) Decide to first go clockwise or anti-clockwise=Clockwise
(3) Decide the number of segments to cover in direction chosen in step 2=5
(4) Decide the number of segments to cover in the opposite direction=3
(5) Decide if shaded segments are skipped=NO In the example of FIG. 4B, the user 110 starts at position A on an outer layer, goes clockwise to cover five segments and stops at position B. Switches to inner layer, to point C, and goes in an opposite direction (now counter-clockwise) and covers 3 segments before stopping at point D.

The value entered through keyboard or user interface 400 will be 70246301 (when the setting for skipping shaded segments were disengaged or set to "NO") which corresponds to all the segments that are between points A and D. 70246301 is also the value sent back to server 112 by the widget app 104 as part of data exchange (see FIG. 1).

Each time widget app 104 displays the graphic user interface (circular or otherwise), the actual numbers inside each segment of the inner and outer circles will be different. Hence the value of data exchange will be different, for the same pattern. This makes such a system less prone to hacking.

Another variant of this pattern matching is when the user 110 elects to skip any shaded segments (when the skip shaded segments is set to "YES"), which further mitigates attempts at hacking. Also, the number of segments to cover in the first direction is set to 4. In FIG. 4B, one segment on the outer layer is shaded. Since the user 110 elected to skip this in this example, the value entered through keypad will be, different. It will now be: 7046301. Note the position of segments B, C, and D in this figure compared to previous positions in FIG. 3B.

The widget app 104 can randomly display zero, one, or more segments in shaded color. Since the numbers in each segment and their shading comes from the data processing app 114, the data processing app 114 can determine if the patterns was the right pattern.

Approach 2: Known Pattern, Entered Graphically

This approach is similar to first approach in that user 110 selects a pattern. This pattern is then conveyed graphically by direct manipulation of the widget application 104 and corresponding user interface.

The direct manipulation can be through a touch screen, or markers that move from one segment to another in response to the user 110 clicking clockwise/counter-clockwise buttons on the widget or entering characters on a keyboard corresponding to the characters shown and uploaded to the pattern in the user interface (200, 300, or 400).

The widget app 104 may also include the shaded numbers in the data exchange sequence sent to data processing app 114. For example, corresponding to FIG. 4B, the data sequence sent can be 70246301 instead of 7046301. Note that now it is an eight-digit value instead of a seven-digit value. One extra digit is for the shaded segment, which is skipped, but the value is still included. The data processing app 114 will strip the shaded value off before comparing the submitted pattern to a stored template pattern.

Approach 3: Known Value, Entered Graphically

In this approach, the user does not remember a pattern, but knows an actual value that has to be entered in the widget app 104. The value has to be entered in such a sway that it is protected from keystroke loggers, shoulder surfers, and any packet sniffers on the network.

Figure 5:
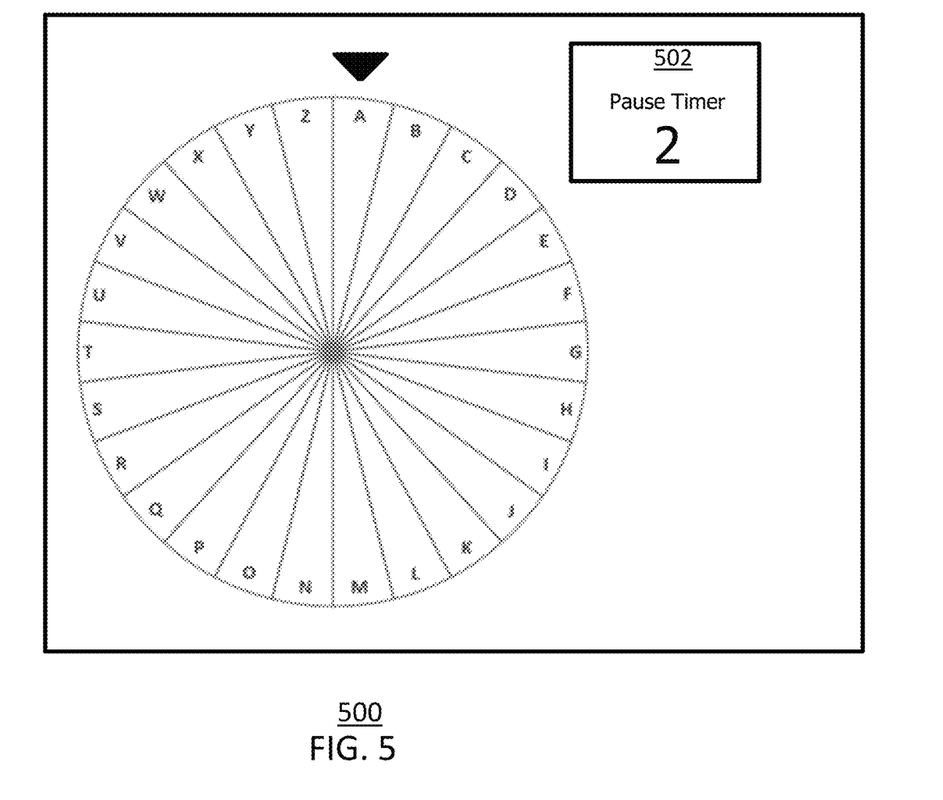
FIG. 5 illustrates a graphic user interface having a rotatable dial and pause entry timer at a client edge device in accordance with the embodiments.
Figure 6:
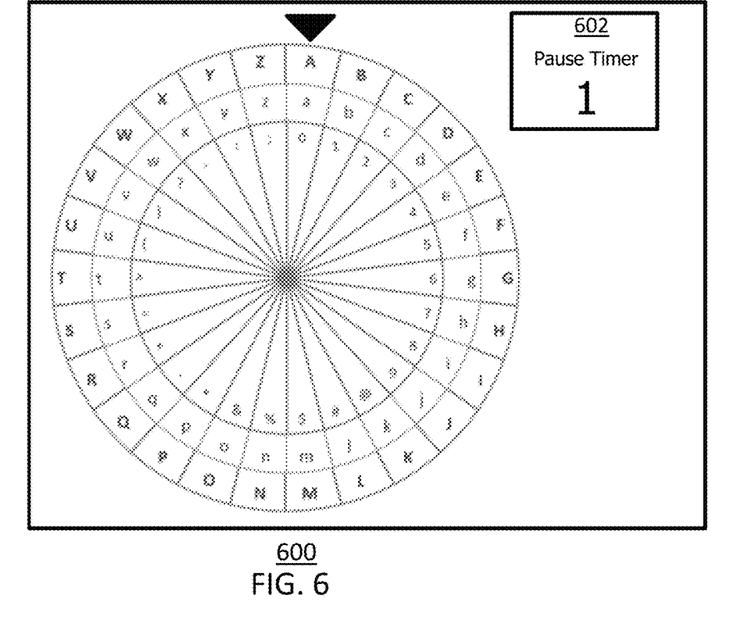
FIG. 6 illustrates a graphic user interface having a rotatable multi-tier or multi-layered dial and pause entry timer at a client edge device in accordance with the embodiments.

This user interfaces 500 and 600 in these embodiments are shown in FIGS. 5 and 6.

FIG. 5 shows a user interface 500 with a single dial for data entry. Since it is single dial, all characters that can be entered have to fit in this dial. The user interface can further include a selection position and pause timer 502.

FIG. 6 shows a user interface 600 with a more complex dial consisting of more than one layer including a selection position and pause timer 602. The need for multiple dials arises since the character set of possible values can be large (e.g. lower case, upper case, numeric, special characters, etc.) and fitting them on a single dial may not be practical.

The user 110 (or client device 102) and server 112 can negotiate rules of entering data as follows:

Decide if data is entered when rotating clockwise or counter-clockwise
Decide the pause timer value, which will register a character entry Once these two are agreed, the user is free to rotate the dials arbitrarily, and as many times as they want. This can be done to confuse the shoulder surfers and keystroke loggers. There can be several mechanisms for dial rotation, such as direct interaction with touch screen, clicking on clockwise/counter-clockwise button on the widget app, etc. In case of multiple dials, each can be rotated independently. A visual indication can be provide to the user to show which dial is in active state, and which segment on that dial has the focus. In case the focus remains for an interval agreed upon between user and server under rules of data entry, the value in that segment is marked as implicated selected by user.

Figure 7:
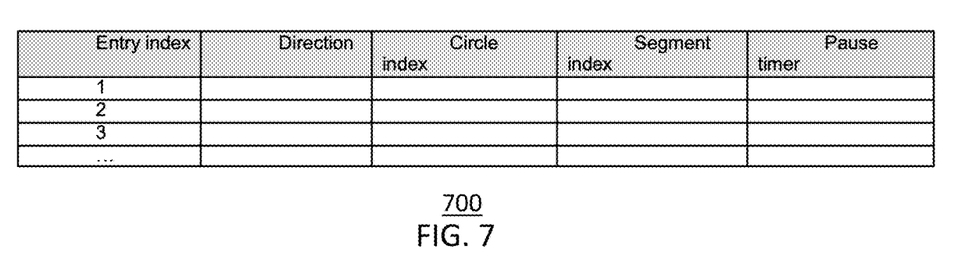
FIG. 7 illustrates an empty index table that can be used in the system of FIG. 1 in accordance with the embodiments.

When the dial is turned, and a new segment gets the focus, the timer display (502 or 602) is reset to "0". This timer starts ticking with the passing of each second, showing the current lapsed time in seconds. This reflects the "pause" in dial rotation. If the pause is less than one second, it is not recorded. For all other cases the widget app 104 can build the following table 700 as shown in FIG. 7 which includes a layout and fields of the table to record data entry.

The columns in table 700 can include an "Entry index" which is a sequentially incrementing number, a "Direction" which is the direction of dial rotation after which a character was selected. It can be clockwise or counter-clockwise. The widget can use a code for direction instead of actual "clockwise" text. For example, 0 for clockwise and 1 for counter-clockwise.

A "Circle index" indicates which circle was active. For example, outer circle with capital letters, middle circle with lower case letters, or an inner circle with numbers and special characters. The circle index is known by both widget application 104 and server 112, and can be any value as long as it is consistently used in one rendering of the widget. The index values can be random, and different for each display of the widget. Since these values are set by the server, the server can comprehend the data returned to it by the widget app.

A "Segment index" identifies the segment within the current circle or the circle index. This will not indicate the actual visible value in that segment, but index of this segment from the start. For example first segment on outer circle that has a visible text of "A" has an index of 1. Sixth segment on the same outer circle has the visible text of "F" but this will be represented by Segment index of 6.

The "Pause timer" column simply represents the number of seconds the dial rotation was paused.

The widget app 104 can capture all these interactions and forward the indexed data to the corresponding table to and at the data processing application 114 at server 112. The widget app 104 can also add its own "noise" that is outside the selections made by the user, as long as it does not get picked up by data processing app as a valid user selection.

Figure 8:
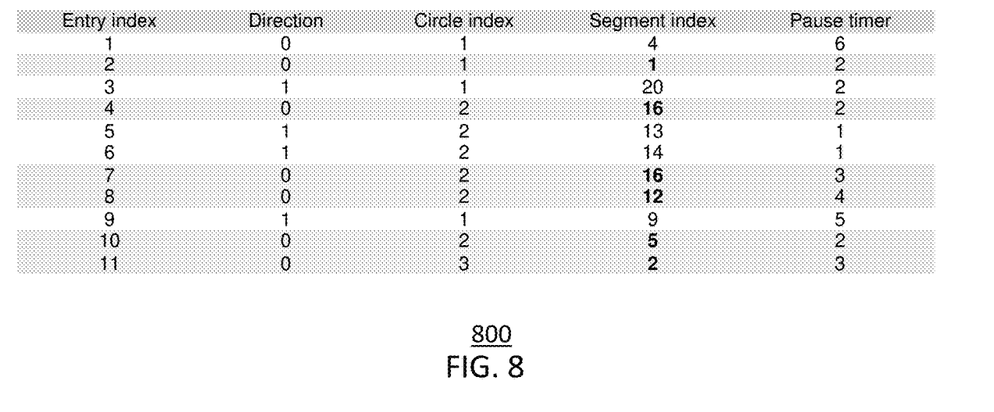
FIG. 8 illustrates an filled index table that can be used in the system of FIG. 1 and the graphic user interface of FIG. 6 in accordance with the embodiments.

One example of this table generated in response to dial rotation by the user 110 is shown in table 800 of FIG. 8. The actual recorded values are shown in one designation and the noise or discarded values are shown with a different designation. This noise can be a result of user interaction, or injected by the widget app itself to obfuscate data transmitted to server.

In the example shown in FIG. 8, the entry rules are:
Selected direction of rotation=CLOCKWISE
Pause timer=2 to 4 Seconds
The index and direction convention used are:
Direction=Clockwise=0, counter-clockwise=1
Circle index=Outer=1, middle=2, inner=3
Segment index=segments in each circle start at 1, and increment clockwise.

The sample table shown in FIG. 8 is formed in response to user 110 entering "Apple 1"

The value of "Apple 1" is constructed by picking up rows 2, 4, 7, 8, 10 and 11 from Table 800. This is done at the data processing app 114 on the server 112.

The rest of the rows are not picked because they either had wrong direction or pause time was outside the desired or designated range.

Figure 9A:
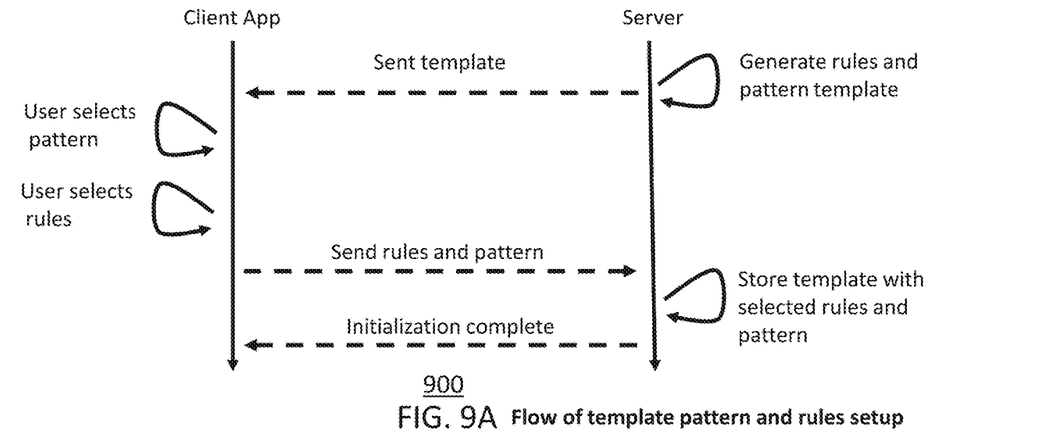
FIG. 9A illustrates a flow of information between a client application and a server application for generating a template pattern and setting up rules for initializing a system in accordance with the embodiments.

Referring to FIG. 9A, a flow diagram 900 illustrates how a client edge device can be initialized with an application or widget app in accordance with the embodiments. Initially, a server can generate rules and create a pattern template as part of a data exchange. The user can further modify or select the template and rules at the client application that can apply and further communicate such rules and pattern back to the server. The server can then further store the template with (the user) selected rules and pattern before the initialization is deemed complete.

Figure 9B:
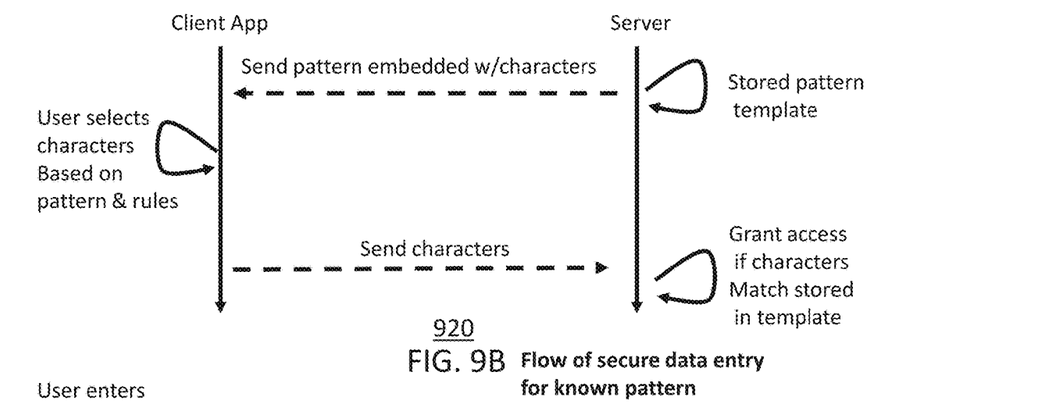
FIG. 9B illustrates a flow of secure data for a known pattern in accordance with the embodiments.

In one example where secure data entry is done with a known pattern as illustrated in the flow diagram 920 of FIG. 9B, the server (or data processing application at the server) stores a pattern template at the server and sends the pattern embedded with characters to the client application. The user then selects the characters based on the known pattern and rules (as may have been set in the flow diagram 900 of FIG. 9A). The client application accordingly sends the characters corresponding to the user selected characters (that were based on the known pattern and rules). If the characters sent by the client match the characters stored in the template at the server, the server then grants access to a restricted resource (113a) at the server or otherwise (113b) controlled by the server.

Figure 9C:
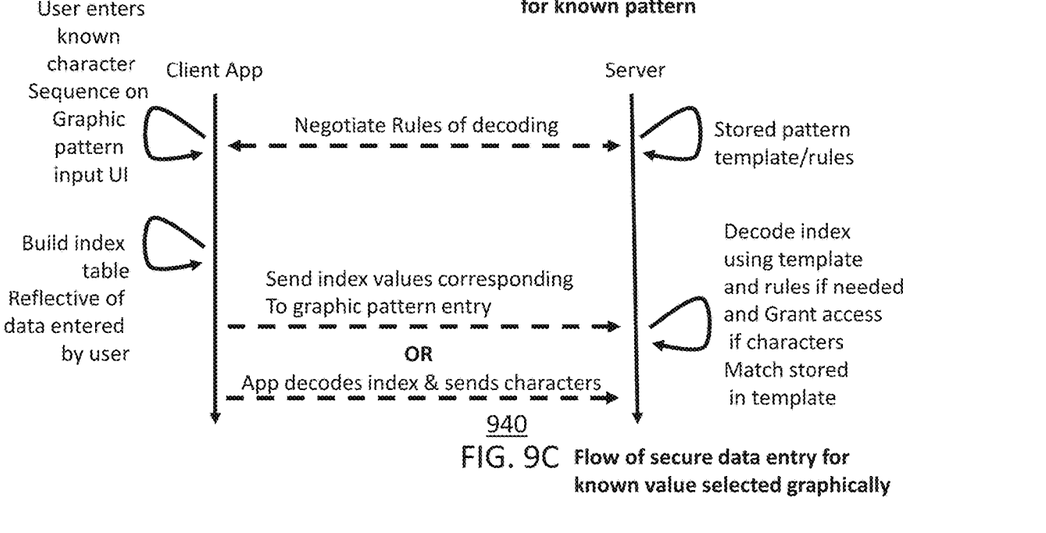
FIG. 9C illustrates a flow of secure data for a known value selected graphically in accordance with the embodiments.

In another example where secure data entry is done with a known value selected graphically as illustrated in the flow diagram 940 of FIG. 9C, the server (or data processing application at the server) stores a pattern template and rules at the server and negotiates the rules of decoding with the client application. The user enters a known character sequence on a graphic pattern input user interface on the client application at the client edge device. As part of the data entry process by the user on the client application at the client edge device, an index table can be built reflective of the data enter by the user. In one embodiment, the client application can send index values corresponding to the graphic pattern entry to the server. In an alternative embodiment, the client application can instead decode the index and send the characters to the server. The server would decode the index using the template and rules (if needed) or in the alternative embodiment the server would directly compare the characters with characters stored in the template. The server would then grant access to a restricted resource (113a) at the server or otherwise (113b) controlled by the server if the decoded characters (or characters in the alternative embodiment) matches the characters store in the template at the server. The restricted resource 113b can be remote to the server 112, but otherwise controlled in terms of access by the server 112.

The embodiments will be beneficial and will make an impact in various scenarios including 1. PIN codes entered on cash machines can also be recovered by analyzing the residual heat left behind on the keypads. So this invention will be very useful for banking transaction in ATM machines
2. Hardware Security Module's (HSM's) keypad to enter PIN,
3. Enhance security for Keyless door locks
4. Sitting in a public place and paying a bill or making a purchase over a cellphone and we entered passwords, credit card PIN
5. Many more such cases etc . . . .

Such new input method will enhance the security for a user to enter sensitive information to access system and will make retrieving the data impossible or at least much more difficult.

In the embodiments, input values stored in a database can be hashed and encrypted for implementation perspective.

The embodiments provide a unique input method to enter short sensitive information (e.g. password, PIN, Messages etc.) on almost any access device.

In some embodiments and with reference to FIGS. 1-11, a system 100 or method (920, 940, 1000, 1100) of secure data entry can include one or more processors and memory having computer instructions which when executed by the one or more processors causes the one or more processors to perform the operations at a client edge device 102 of executing a user interface data entry application 104 on the client edge device, receiving data by the user interface data entry application, where the data entered is a graphic input pattern (200—A to B, or 300—A to D, 400—A to D) corresponding to alphanumeric digits, communicating the data entered to a server 112, and receiving access to (a restricted resource 113a or 113b) controlled by the server 112 when a data processing application 114 at the server 112 interprets the data entered as a credential. Note that in accordance with some of the embodiments, either the graphic pattern or the underlying characters associated with the graphic pattern will vary in each instance to provide additional security (and obfuscation).

In some embodiments, the user interface data entry application 104 receives a sequence of random or pseudo-random alphanumeric characters from the server 114 for populating the graphic input pattern in a random or pseudo-random fashion and the client edge device 102 transmits back to the server 112 a portion of the sequence of the random or pseudo-random characters corresponding to a graphic template previously stored at the server when the graphic input pattern entered at the client edge device matches the credentials matching a set of alphanumeric characters stored corresponding to the graphic template at the server 112.

In some embodiments, the graphic input pattern (200, 300, or 400) is a circular pie containing a plurality of slices where each slice corresponds to a user selectable slice selectable by swiping by the slice, or clicking on the slice, or entering a sequence of characters on a keyboard corresponding to characters populated in the slices of the graphic input pattern.

In some embodiments, the graphic input pattern is a circular pie containing a plurality of slices, where each slice corresponds to a user selectable slice selectable by swiping by the slice or clicking on the slice or entering a sequence of characters on a keyboard corresponding to characters populated in the slices of the graphic input pattern for a predetermined number of consecutive slices in a clockwise or counterclockwise direction as defined by rules set apriori between the client edge device 102 and server 112.

In some embodiments as shown in FIG. 3A, 3B, 4A, or 4B, the graphic input pattern has at least two layered circle patterns containing a plurality of segments, where each segment corresponds to a user selectable segment selectable by swiping by or clicking on segments on at least a first layer for a predetermined number of consecutive segments in a clockwise or counterclockwise direction and subsequently swiping by or clicking for another predetermined number of consecutive segments on a second layer in a direction opposite from the direction used for the first layer. The rules can define a number of parameters or settings such as selecting a start position, which layer is considered first (outer or inner or a certain numbered layer), which direction is consider first (clockwise or counterclockwise), how many steps or slices are selected in a particular first direction (e.g., 1, 2, 3, etc.), how many steps or slices are selected in a direction opposite the first direction (e.g., 1, 2, 3, etc.), how many characters are to be considered per segment or slice (e.g., 1, 2, 3, etc.), and whether shaded segments are to be skipped (e.g., YES or NO or 1 or). Any number of parameters can be part of the rules negotiated between the client device and server.

Figure 2B:
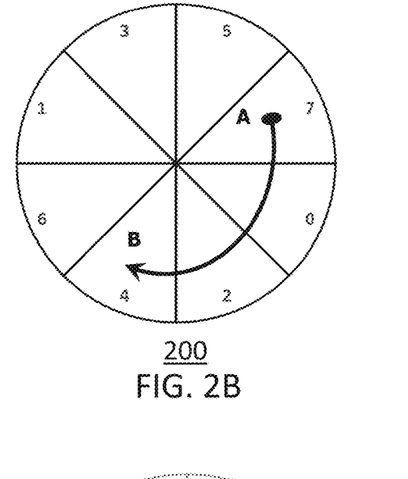
FIG. 2B represents a form of secure data entry (from point A to point B) using the graphic user interface of FIG. 2A.

In some embodiments having just a single layer as in FIG. 2B, the user interface data entry application can include settings for selecting a start position, an initial rotation direction for a first layer of a circular input pattern, and a number of consecutive segments to advance in the initial rotation direction for the first layer.

In some embodiments having more than a first layer as illustrated in FIG. 3B, the user interface data entry application can further include settings for selecting a number of segments to advance in an opposition direction from the initial rotation direction on a second layer of the circular input pattern.

In some embodiments having shaded segments as shown in FIG. 4B, the user interface data entry application can further include settings for skipping shaded segments which can be done with shaded segments on either the first layer or the second layer or on both layers or on any number of layers in a multi-layered pattern.

In some embodiments, the user interface data entry application receives a sequence of alphanumeric digits from the server for populating the graphic input pattern in a known pattern (instead of random pattern) and the client edge device receives access to the server when it transmits back to the server a portion of the sequence of the alphanumeric digits corresponding to a graphic template previously stored at the server if the graphic input pattern entered at the client edge device matches the credential matching a set of alphanumeric numbers stored at the graphic template at the server based on rules negotiated and set between the client edge device and server. In this embodiment, a distinguishing aspect between this embodiment and other embodiments previously described can be that the known pattern include not only a known graphic pattern, but a known sequence of numbers that may not change in sequence. Thus, it may not be considered as secure as other embodiments, but the applied rules negotiated between the client edge device and server may still provide a higher level of security than just a pre-existing known pattern and known sequence of underlying characters since the system will also need to know the negotiated rules as well (skipped shaded segments, which layer or tier to consider, etc.).

In some embodiments as shown in FIG. 9B, the user interface data entry application initially communicates the graphic input pattern as a template pattern to the server and the user interface data entry application subsequently receives from the server a plurality of characters such as alphanumeric digits for randomly occupying each of the segments of the graphic input pattern and where the client edge device in response to user input of correct credentials in graphic form sends a sequential listing of alphanumeric digits to the server corresponding to the template pattern with corresponding matching alphanumeric digits therein.

In some embodiments, the user interface data entry application generates a graphic user interface (500 or 600 as shown in FIG. 5 or 6 respectively) having a movable and selectable graphic pattern or patterns with a plurality of segments populated with alphanumeric characters selectable by manipulation of the selectable graphic pattern and pausing on a particular alphanumeric character for a predetermined threshold time frame for selection.

In some embodiments, the user interface data entry application (104) includes settings for selecting an initial rotation direction (clockwise or counter-clockwise) and for selecting a pause timer value used for registering a character entry. The selection by the user can populate an index table 700 or 800 as shown in respective FIG. 7 or 8.

In some embodiments, the movable and selectable graphic patterns 600 has at least two layered circle patterns as shown in FIG. 6 containing a plurality of segments, where each segment corresponds to a user selectable segment having a corresponding alphanumeric character that is selectable by rotating one or more dials, each dial corresponding to each layer of the at least two layered circle patterns and where each dial can be independently rotated. In some embodiments, the layers may not be able to be independently rotated and a separate column on an index table may be added to reflect such status. In some embodiments, the user interface data entry application 104 captures user interactions with the one or more dials and constructs a table 800 as illustrated in FIG. 8 including an entry index, direction, circle index, segment index and pause timer to decode a data entry for credentials according to predefined rules coordinated between the user interface data entry application (104) on the client edge device 102 and the data processing application (114) at the server 112.

In some embodiments, a system of secure data entry can include one or more processors and memory coupled to the one or more processors, where the memory includes computer instructions which when executed by the one or more processors causes the one or more processors to perform the operations at a data processing application at a server 112 of executing the data processing application 114 at the server, exchanging data between the data processing application and a user interface data entry application on a client edge device as shown in the flow diagram 940 of FIG. 9C, receiving data from the client edge device from the user interface data entry application, wherein the data entered at the client edge device results from a graphic input pattern corresponding to alphanumeric characters stored at the server, and providing access to a restricted resource (113*a* and/or 113*b*) on or controlled by the server 112 when a data processing application at the server interprets the data entered as a credential.

In some embodiments, the server 112 sends the user interface data entry application 104 a sequence of random or pseudo-random alphanumeric digits for populating the graphic input pattern in a random or pseudo-random fashion and the server receives back from the client edge device a portion of the sequence of the random or pseudo-random digits corresponding the graphic input pattern entered at the client edge device and where access is granted to the restricted resource (113*a* or 113*b*) on or controlled by the server if alphanumeric characters from the graphic input pattern entered at the client edge device matches alphanumeric characters at a graphic template previously stored at the server (see FIGS. 9B and 9C).

In some embodiments, the data processing application at the server initially receives from the user interface data entry application the graphic input pattern as a template pattern and the server subsequently sends to the user interface data entry application at the client edge device a plurality of alphanumeric digits for randomly occupying each of the segments of the graphic input pattern, and where the client edge device in response to user input of correct credentials in graphic form sends and the server receives a sequential listing of alphanumeric digits corresponding to the template pattern with corresponding matching alphanumeric digits therein (see flow diagram 940 of FIG. 9C).

In some embodiments, the user interface data entry application 104 generates a graphic user interface (500 or 600 as shown in FIG. 5 or 6 respectively) having a movable and selectable graphic pattern or patterns with a plurality of segments populated by the server with alphanumeric characters selectable by manipulation of the selectable graphic pattern and pausing on a particular alphanumeric character for a predetermined threshold time frame for selection and the user interface data entry application further generates and sends data to populate an index table (700 or 800 of FIG. 7 or 8 respectively) corresponding to the data entered using the graphic user interface where the server uses the data from the index table (800) to decode the data selected by the user interface data entry application 104 and received by the data processing application 114 at the server 112.

Figure 10:
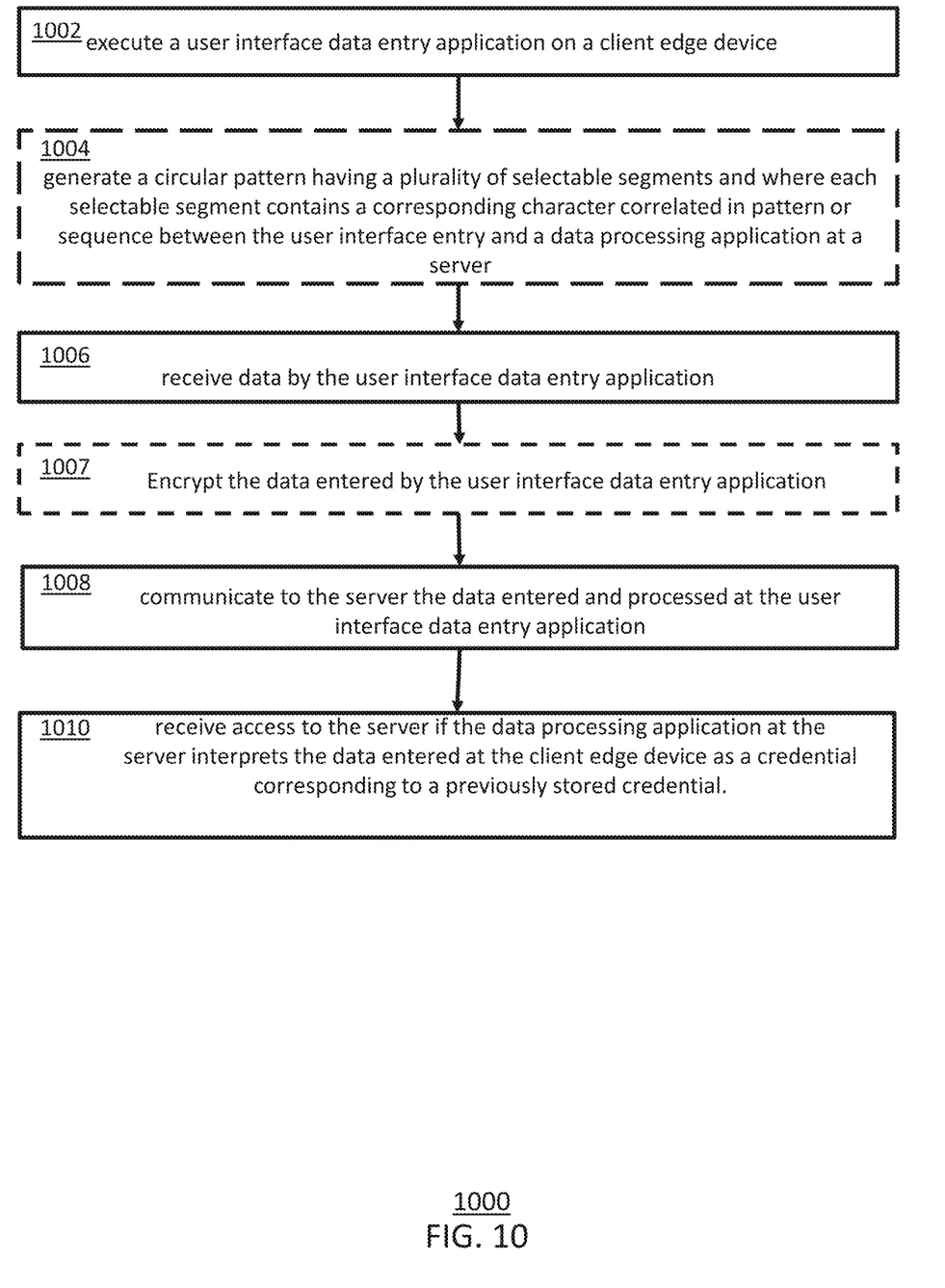
FIG. 10 illustrates a flow chart of a method of secure data entry at a client edge device in accordance with the embodiments.

In some embodiments as illustrated by FIG. 10, a method 1000 of secure data entry can include the steps of executing at 1002 a user interface data entry application on the client edge device wherein the user interface data entry application generates at 1004 a circular pattern (in a particular embodiment) having a plurality of selectable segments and where each selectable segment contains a corresponding character correlated in pattern or sequence between the user interface entry application at the client edge device and a data processing application at a server, receiving data at 1006 by the user interface data entry application, and communicating at 1008 to the server the data entered and processed at the user interface data entry application. The method 1000 can further include the step 1010 of receiving access to a restricted resource on the server if the data processing application at the server interprets the data entered at the client edge device as a credential corresponding to a previously stored credential. In some embodiments, the data entered by the user interface data entry application can be encrypted at 1007 to provide a more robust and secure system.

In some embodiments, the circular pattern noted at block 1004 having the plurality of selectable segments actuates the selection of a sequence of corresponding characters by either selecting a graphic pattern formed from a sequence of adjacent selectable segments (as in the patterns 200, 300, or 400 in FIG. 3, 4, or 5) or by rotating one or more layers of segments to a selection position and pausing at the selection position for a predetermined threshold period before further rotating the one or more layers of segments as illustrated in another embodiment of the graphic pattern as shown in the patterns 500 or 600 in FIG. 5 or 6 respectively).

Figure 11:
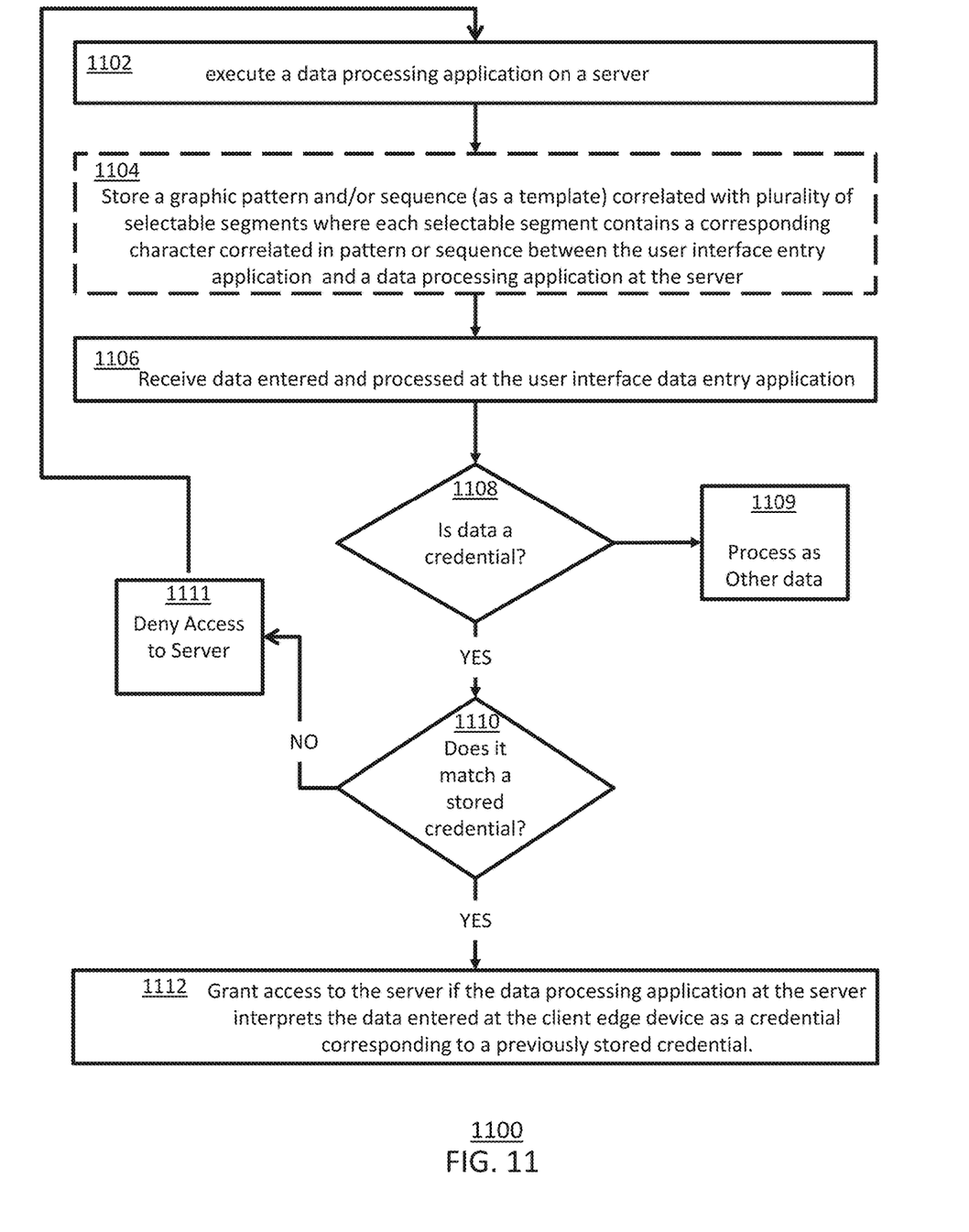
FIG. 11 illustrates a flow chart of a method of secure data entry at a server in accordance with the embodiments.

Referring to FIG. 11, a method 1100 of securely entering data from a server perspective is illustrated. At 1102, a server such as server 112 executes a data processing application (such as application 114). In some embodiments, the method at 1104 can store a graphic pattern and/or sequence as a template correlated with a plurality of selectable segments where each selectable segment contains a corresponding character correlated in pattern or sequence (or even both in some embodiments) between the user interface entry application and a data processing application at the server. At step 1106, the server can receive data entered and processed at the user interface data entry application. At decision block 1108, if the data entered is indicative of a credential (password, pin, etc.), then decision block 1110 further determines if the data entered matches a stored credential at the server. If a match exists at decision block 1110, then the server can grant access to the server or a restricted resource (113*a*) at the server or at a remove location (113*b*) controlled by the server. If at decision block 1108, the data processing application at the server determines that the data entered is not a credential, then the server will process the data as something other than credential data at block 1109. If the apparent credential data at decision block 1110 does not match a stored credential, then the server 112 will deny access to the restricted resource (113*a* or 113*b*) and possibly to the server itself.

In the absence of any specific clarification related to its express use in a particular context, where the terms "substantial" or "about" or "usually" in any grammatical form are used as modifiers in the present disclosure and any appended claims (e.g., to modify a structure, a dimension, a measurement, or some other characteristic), it is understood that the characteristic may vary by up to 30 percent.

The terms "include" and "comprise" as well as derivatives thereof, in all of their syntactic contexts, are to be construed without limitation in an open, inclusive sense, (e.g., "including, but not limited to"). The term "or," is inclusive, meaning and/or. The phrases "associated with" and "associated therewith," as well as derivatives thereof, can be understood as meaning to include, be included within, interconnect with, contain, be contained within, connect to or with, couple to or with, be communicable with, cooperate with, interleave, juxtapose, be proximate to, be bound to or with, have, have a property of, or the like.

Unless the context requires otherwise, throughout the specification and claims which follow, the word "comprise" and variations thereof, such as, "comprises" and "comprising," are to be construed in an open, inclusive sense, e.g., "including, but not limited to."

Reference throughout this specification to "one embodiment" or "an embodiment" or "some embodiments" and variations thereof mean that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content and context clearly dictates otherwise. It should also be noted that the conjunctive terms, "and" and "or" are generally employed in the broadest sense to include "and/or" unless the content and context clearly dictates inclusivity or exclusivity as the case may be. In addition, the composition of "and" and "or" when recited herein as "and/or" is intended to encompass an embodiment that includes all of the associated items or ideas and one or more other alternative embodiments that include fewer than all of the associated items or idea.

In the present disclosure, conjunctive lists make use of a comma, which may be known as an Oxford comma, a Harvard comma, a serial comma, or another like term. Such lists are intended to connect words, clauses or sentences such that the thing following the comma is also included in the list.

As the context may require in this disclosure, except as the context may dictate otherwise, the singular shall mean the plural and vice versa. All pronouns shall mean and include the person, entity, firm or corporation to which they relate. Also, the masculine shall mean the feminine and vice versa.

When so arranged as described herein, each computing device or processor may be transformed from a generic and unspecific computing device or processor to a combination device comprising hardware and software configured for a specific and particular purpose providing more than conventional functions and solving a particular technical problem with a particular technical solution. When so arranged as described herein, to the extent that any of the inventive concepts described herein are found by a body of competent adjudication to be subsumed in an abstract idea, the ordered combination of elements and limitations are expressly presented to provide a requisite inventive concept by transforming the abstract idea into a tangible and concrete practical application of that abstract idea.

The headings and Abstract of the Disclosure provided herein are for convenience only and do not limit or interpret the scope or meaning of the embodiments. The various embodiments described above can be combined to provide further embodiments. Aspects of the embodiments can be modified, if necessary to employ concepts of the various patents, application and publications to provide further embodiments.

The invention claimed is:

1. A system of secure data entry, comprising:
one or more processors and memory coupled to the one or more processors, wherein the memory includes computer instructions which when executed by the one or more processors causes the one or more processors to perform the operations at a client edge device of:
executing a user interface data entry application on the client edge device;
receiving data by the user interface data entry application, wherein the data entered is a graphic input pattern corresponding to alphanumeric characters, wherein the graphic input pattern is a circular pie having at least two layered circle patterns each containing a plurality of slices, selectable by swiping for a predetermined number of consecutive slices in a clockwise or counterclockwise direction;
creating a table on said client edge device from said data, the table comprising a field and a row, said field consisting of entries for: a rotation direction, a circle index, a slice index and a pause timer;
detecting pauses in dial rotations along said swiping of the clockwise or counterclockwise direction;
adding another row in the table with values for said field entry for pauses detected thereby injecting table noise that obfuscates said data transmitted to the server;
communicating said table with the obfuscated data entered to a server;
constructing, at the server, a subset of said table in accordance with rules set apriori between the client edge device and the server by:
picking up only those rows in sequential order from the table having:
a designated pause timer range, and then
a correct rotation direction and a correct circle index;
constructing, from the subset, a value from slice indexes of those rows;
stripping out indexes from the value not corresponding to shaded segments, thereby discarding said obfuscated data at the server;
receiving access to a restricted resource controlled by the server for a data processing application at the server that interprets the value entered as a credential that matches a stored credential at the server; and
processing the data as other data if the server interprets the data entered as something other than the credential or denying access if the server interprets the data entered as the credential that fails to match the stored credential.

2. The system of claim 1, wherein the user interface data entry application receives a sequence of random or pseudo-random alphanumeric characters from the server for populating the graphic input pattern in a random or pseudo-random fashion and the client edge device transmits back to the server a portion of the sequence of the random or pseudo-random characters corresponding to a graphic template previously stored at the server when the graphic input pattern entered at the client edge device matches the credential matching a set of alphanumeric characters stored corresponding to the graphic template at the server.

3. The system of claim 1, wherein the graphic input pattern is a circular pie containing a plurality of slices wherein each slice corresponds to a user selectable slice selectable by swiping by the slice, and wherein the characters populated in the slices vary in each instance.

4. The system of claim 1, wherein the graphic input pattern having at least two layered circle patterns containing a plurality of segments, wherein each segment corresponds to a user selectable segment selectable by swiping on at least a first layer for a predetermined number of consecutive segments in a clockwise or counterclockwise direction and subsequently swiping by for another predetermined number of consecutive segments on a second layer in a direction opposite from the direction used for the first layer.

5. The system of claim 1, wherein the user interface data entry application includes settings for selecting a start position, an initial rotation direction for a first layer of a circular input pattern, and a number of consecutive segments to advance in the initial rotation direction for the first layer,
wherein said rules define for the user said start position, which layered circle pattern is first, said initial rotation direction of clockwise and counterclockwise is first, how many slices are selected in a particular first direction, how many slices are selected in a direction opposite the first direction, how many characters per slice, the designated pause timer range, and whether shaded segments are skipped and stripped from the table.

6. The system of claim 5, wherein the user interface data entry application further includes settings for selecting a number of segments to advance in an opposition direction from the initial rotation direction on a second layer of the circular input pattern.

7. The system of claim 1, wherein the user interface data entry application receives a sequence of alphanumeric digits from the server for populating the graphic input pattern in a known pattern and known sequence and the client edge device receives access to the server when it transmits back to the server at least a portion of the sequence of the alphanumeric digits corresponding to a graphic template previously stored at the server for the graphic input pattern entered at the client edge device that matches the credential matching a set of alphanumeric numbers stored at the graphic template at the server in accordance with the rules negotiated between the user interface data entry application and the data processing application at the server.

8. The system of claim 1, wherein the user interface data entry application initially communicates the graphic input pattern as a template pattern to the server and the user interface data entry application subsequently receives from the server a plurality of alphanumeric digits for randomly occupying each of the segments of the graphic input pattern and wherein the client edge device in response to user input of correct credentials in graphic form sends a sequential listing of alphanumeric digits to the server corresponding to the template pattern with corresponding matching alphanumeric digits therein.

9. The system of claim 1, wherein the user interface data entry application generates a graphic user interface having a movable and selectable graphic pattern or patterns with a plurality of segments populated with alphanumeric characters selectable by manipulation of the selectable graphic pattern and pausing on a particular alphanumeric character for a predetermined threshold time frame for selection.

10. The system of claim 9, wherein the movable and selectable graphic patterns has at least two layered circle patterns containing a plurality of segments, wherein each segment corresponds to a user selectable segment having a corresponding alphanumeric character that is selectable by rotating one or more dials, each dial corresponding each layer of the at least two layered circle patterns and wherein each dial can be independently rotated.

11. A method of secure data entry, comprising:
one or more processors and memory coupled to the one or more processors, wherein the memory includes computer instructions which when executed by the one or more processors causes the one or more processors to perform the operations at a client edge device of:
executing a user interface data entry application on the client edge device;
receiving data by the user interface data entry application, wherein the data entered is a graphic input pattern corresponding to alphanumeric characters, wherein the graphic input pattern is a circular pie having at least two layered circle patterns each containing a plurality of slices, selectable by swiping for a predetermined number of consecutive slices in a clockwise or counterclockwise direction;
creating a table on said client edge device from said data, the table comprising a field and a row, said field consisting of entries for: a rotation direction, a circle index, a slice index and a pause timer;
detecting pauses in dial rotations along said swiping of the clockwise or counterclockwise direction;
adding another row in the table with values for said field entry for pauses detected to inject noise and obfuscate said data transmitted to the server;
communicating said table to the server with obfuscated data entered and processed at the user interface data entry application;
constructing, at the server, a subset of said table in accordance with rules set apriori between the client edge device and the server that picks up only those rows in sequential order from the table having:
a designated pause timer range, and then
a correct rotation direction and a correct circle index;
constructing, from the subset, a value from slice indexes of those rows;
stripping out indexes from the value not corresponding to shaded segments, thereby discarding said obfuscated data;
receiving access to the server if the value processing application at the server interprets the data entered at the client edge device as a credential corresponding to a previously stored credential.

12. The method of claim 11, wherein the circular pattern having the plurality of selectable segments actuates the selection of a sequence of corresponding characters by either selecting a graphic pattern formed from a sequence of adjacent selectable segments or by rotating one or more layers of segments to a selection position and pausing at the selection position for a predetermined threshold period before further rotating the one or more layers of segments in a same rotational direction before said pausing
wherein said rules rules define for the user a start position, which layered circle pattern is first, which direction of clockwise and counterclockwise is first, how many slices are selected in a particular first direction, how many slices are selected in a direction opposite the first direction, how many characters per slice, the designated pause timer range, and whether shaded segments are skipped and stripped from the table.

* * * * *